(12) United States Patent
Lake et al.

(10) Patent No.: US 11,866,456 B2
(45) Date of Patent: Jan. 9, 2024

(54) PROCESS FOR TREATING LIGNIN (71) Applicant: Liquid Lignin Company

(72) Inventors: Michael A. Lake, Mt. Pleasant, SC (US); John C. Blackburn, Easley, SC (US); J. George Hayden, Awendaw, SC (US)

(73) Assignee: Liquid Lignin Company, Georgetown, SC (US)

( * ) Notice: Subject to any disclaimer, the term of this patent is extended or adjusted under 35 U.S.C. 154(b) by 177 days.

(21) Appl. No.: 17/372,872

(22) Filed: Jul. 12, 2021

(65) Prior Publication Data

US 2022/0017555 A1    Jan. 20, 2022

Related U.S. Application Data (60) Provisional application No. 63/051,609, filed on Jul. 14, 2020.

(51) Int. Cl.
*C07G 1/00* (2011.01)
*D21C 11/00* (2006.01)

(52) U.S. Cl.
CPC ............ *C07G 1/00* (2013.01); *D21C 11/0007* (2013.01)

(58) Field of Classification Search
CPC .......................... D21C 11/0007; C07G 1/00
See application file for complete search history.

(56) References Cited

U.S. PATENT DOCUMENTS

| | | | | |
|---|---|---|---|---|
| 2,828,297 | A * | 3/1958 | Giesen | D21C 11/04 530/500 |
| 3,666,426 | A | 5/1972 | Burckhardt | |
| 3,702,346 | A | 7/1972 | Kellar | |
| 3,965,013 | A * | 6/1976 | Jackson | B01D 21/26 210/534 |
| 9,790,641 | B2 * | 10/2017 | Lake | D21C 9/02 |
| 2003/0116871 | A1 | 6/2003 | Ringo et al. | |
| 2004/0122262 | A1 | 6/2004 | Ellison et al. | |
| 2006/0086284 | A1 | 4/2006 | Zhang et al. | |
| 2010/0325947 | A1 * | 12/2010 | Ohman | D21C 11/0007 44/606 |
| 2011/0294991 | A1 * | 12/2011 | Lake | C08H 8/00 530/500 |
| 2014/0121359 | A1 * | 5/2014 | Thies | C07G 1/00 530/500 |

(Continued)

*Primary Examiner* — Liam J Heincer
(74) *Attorney, Agent, or Firm* — Walters & Wasylyna LLC (57) ABSTRACT

This invention provides improvements to processes for making granular lignin from black liquor. One of the improvements is that the use of a pre-carbonation column reduces the $CO_2$ flow into the sparger of a carbonation column. The pre-carbonation column is used to reduce the pH of the black liquor to about 12. Another improvement is that it has been found that coalescing droplets into a bulk liquid-lignin phase can be enhanced by placing the exit of the carbonation column at or slightly beneath carbonated black liquor/liquid-lignin interface. It has also been found that operating the carbonation settler at a low pressure and pumping the liquid-lignin from the carbonation settler to the acidification reactor operating at a higher pressure allows recycling the vent gas from the acidification reactor to the pre-carbonation column. The invention also provides for a vent gas absorber.

20 Claims, 7 Drawing Sheets

(56) References Cited

U.S. PATENT DOCUMENTS

| | | | |
|---|---|---|---|
| 2014/0275498 A1* | 9/2014 | Littorin | D21C 11/0007 |
| | | | 530/500 |
| 2014/0288284 A1* | 9/2014 | Bjorklund | C08H 8/00 |
| | | | 530/500 |
| 2015/0075738 A1* | 3/2015 | Wimby | D21C 11/0007 |
| | | | 162/16 |
| 2015/0119559 A1* | 4/2015 | Ohman | C08H 8/00 |
| | | | 530/500 |
| 2016/0017541 A1* | 1/2016 | Lake | D21C 11/0007 |
| | | | 162/16 |
| 2016/0076199 A1* | 3/2016 | Lake | D21C 9/002 |
| | | | 162/16 |
| 2016/0115281 A1* | 4/2016 | Lake | C08H 6/00 |
| | | | 530/500 |
| 2016/0137680 A1* | 5/2016 | Thies | B01D 11/00 |
| | | | 530/507 |
| 2019/0062508 A1* | 2/2019 | Winsness | C08K 5/05 |
| 2019/0309002 A1* | 10/2019 | Miettinen | C08H 8/00 |
| 2021/0261590 A1* | 8/2021 | Kienberger | D21C 11/0007 |

\* cited by examiner

FIG. 7

PROCESS FOR TREATING LIGNIN

CROSS REFERENCE TO RELATED APPLICATION

The contents of Provisional Application U.S. Ser. No. 63/051,609 filed Jul. 14, 2020, on which the present application is based and benefit claimed under 35 U.S.C. § 119(e), is herein incorporated by reference.

BACKGROUND OF THE INVENTION

(1) Field of the Invention

The present invention relates to improvements in manufacturing lignin from black liquor from a papermaking or wood pulping operation or a crude lignin waste stream from a biomass pulping process.

(2) The Prior Art

Processes for recovering lignin from black liquor have been developed through the years. One such process is described in U.S. Pat. No. 9,260,464 ("the '464 patent"), which is incorporated herein by reference, in which black liquor is carbonated, allowed to settle into a dense liquid-lignin phase and a light lignin-depleted phase. The dense liquid-lignin phase is then acidified to produce a solid lignin. The improvements described herein while broadly applicable to lignin producing processes are especially useful for improving the process described in the '464 patent.

In the process of the '464 patent, the pH of kraft black liquor from a pulp mill having a pH of about 14 is reduced to a pH between about 9 and 11.5. One known method of reducing the pH of black liquor is by carbonating the black liquor with carbon dioxide ($CO_2$) in a carbonation column. Above the sparger $CO_2$ bubbles rising react with the falling black liquor, forming liquid-lignin droplets that coalesce into larger globules of liquid-lignin that sink within the continuous phase of the carbonated black liquor. The larger the globule, the higher is the rate of settling. These globules are fragile and can be cleaved by excessively agitating the carbonated black liquor. The globules that form in the upper part of the carbonation column must pass directly by the sparger, going through the highest zone of agitation created by the $CO_2$ gas exiting the orifices of the sparger. These globules can be sheared to form a stable liquid-in-liquid emulsion of small liquid-lignin droplets.

The small liquid-lignin droplets fall into a carbonation settler below the carbonation column. A heavy layer of the emulsion accumulates in the bottom of the carbonation settler and has higher concentrations of carbonated black liquor that the normal bulk liquid-lignin and is undesirably transferred into the acidification reactor. This condition causes several problems, including creation of a stable dispersion of solid lignin in acid brine which is difficult to filter, higher amounts of sulfuric acid being consumed by the interstitial carbonated black liquor of the heavy layer, and higher rates of sulfurous vent-gas created in the acidification reactor. It is desirable—but difficult to achieve—that large globules of liquid-lignin remain intact and coalesce into a bulk liquid-lignin phase within the carbonation settler that—when transferred to the acidification reactor—creates easily filtered, irregularly shaped, solid lignin particles using minimal amounts of sulfuric acid ($H_2SO_4$) and generating minimal levels of sulfur gases.

A major negative for presently used lignin recovery technologies is the high level of water returned to the mill. Present lignin producing processes indicate returns of two (2) mass units of water to the host mill for each mass unit of lignin recovered. This water is needed: (i) to wash sulfate salts from the lignin to achieve relatively low levels of inorganic ash; (ii) to slurry the carbonated lignin filter cake so that a fluid slurry is formed before the addition of sulfuric acid; and (iii) to keep the normality of the sulfuric acid relatively low to prevent charring the lignin because of localized over-heating. The acidification reactor of the lignin producing process described in the '464 patent is highly agitated, and the temperature is elevated (for example, from 80° C.-110° C.). The normality of the sulfuric acid added to the dense liquid-lignin can be relatively high without charring the lignin.

SUMMARY OF THE INVENTION

The present invention provides improvements to processes for making granular lignin. One of the improvements is that it has been found that the use of a pre-carbonation column reduces the $CO_2$ flow into the sparger of a carbonation column. The pre-carbonation column is used to reduce the pH of the black liquor to about 12.

Another improvement is that it has been found that coalescing droplets into a bulk liquid-lignin phase can be enhanced by placing the exit of the carbonation column at or slightly beneath the carbonated black liquor/bulk liquid-lignin interface. Another feature is that the yield of liquid-lignin and the resulting acidified lignin is improved when structured packing is placed in the bottom of the carbonation column below the $CO_2$ sparger and around the upper section of the annulus of the carbonation settler.

It has also been found that operating the carbonation settler at a low pressure and pumping the liquid-lignin from the carbonation settler to the acidification reactor operating at a higher pressure allows recycling the vent gas from the acidification reactor to the pre-carbonation column.

The invention also provides for a vent gas absorber. Since there is no air in the pre-carbonation column, carbonation column, carbonation settler, or acidification reactor, the vapor spaces are devoid of air and contain only $H_2S$, $CO_2$, and water vapor with trace amounts of other sulfur gases. The reaction of these concentrated acid gases in the vent gas absorber with NaOH is rapid since mass transfer is not impeded by air. This allows virtually complete absorption of dangerous $H_2S$ from these vents, recovering the $H_2S$ as expensive NaSH which is a pulping catalyst in kraft pulp mills.

It is the general object of the present invention to provide improvements in processes for producing porous granular lignin.

Other objects, features and advantages of the invention will be apparent to those skilled in the art from the following detailed description taken in conjunction with the drawings.

BRIEF DESCRIPTION OF THE DRAWINGS

Having described the invention in general terms, reference will now be made to the accompanying drawings, which are not necessarily drawn to scale and wherein.

DESCRIPTION OF THE PREFERRED EMBODIMENT(S)

The present invention now will be described more fully hereinafter with reference to the accompanying drawings, in which preferred embodiments of the invention are shown. This invention may, however, be embodied in many difference forms and should not be construed as limited to the embodiments set forth herein; rather these embodiments are provided so that this disclosure will be thorough and complete and will fully convey the scope of the invention to those skilled in the art.

In the production of porous granular lignin, it has been found that pre-carbonating black liquor in a pre-carbonation column reduces the carbon dioxide ($CO_2$) flow into the sparger of the carbonation column by one-third or more, splitting the $CO_2$ load between the pre-carbonation column and the carbonation column. This significantly reduces the turbulence in the zone just above the sparger of the carbonation column and increases the likelihood of large globules of liquid-lignin surviving to enter the quiet zones of the carbonation settler to coalesce further into a dense bulk liquid-lignin phase containing minimal levels of lignin-depleted carbonated black liquor.

Figure 1:
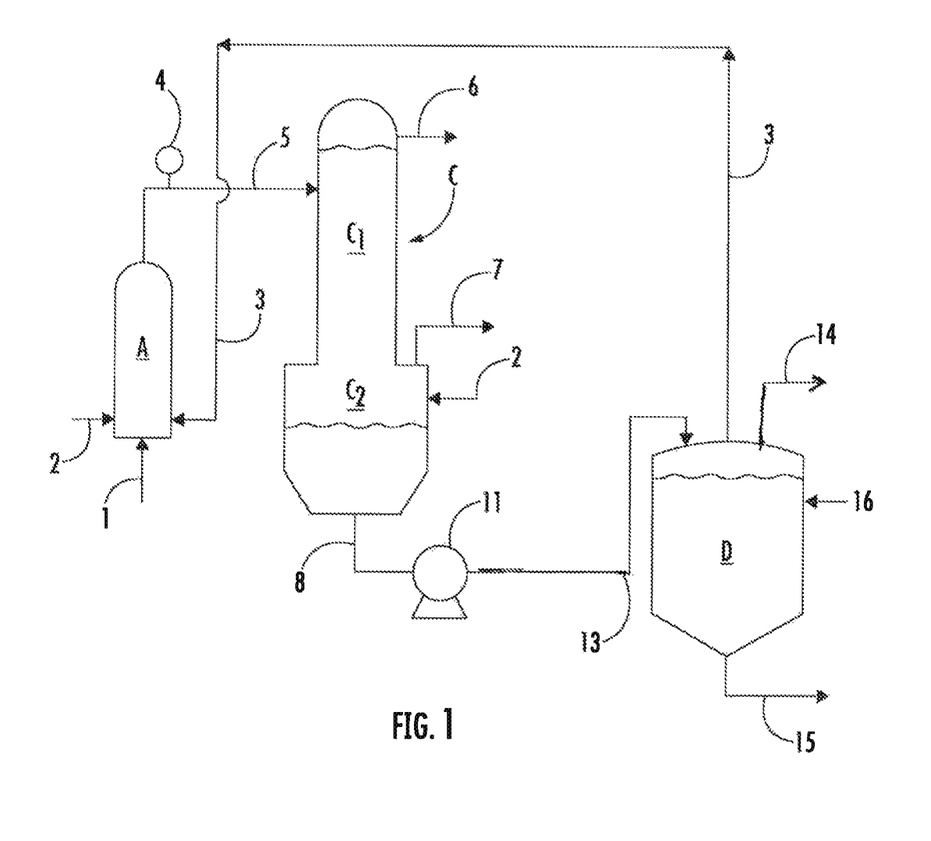
FIG. 1 is a schematic flow diagram illustrating an embodiment of a portion of the process of the present invention showing the pre-carbonation column connected to the carbonation column, and carbonation settler, followed by the acidification reactor.

Referring to FIG. 1, there is shown a schematic flow diagram of an embodiment of a process of the present invention showing the steps of pre-carbonating a stream of black liquor, carbonating to form a liquid-lignin, subjecting the carbonated black liquor to a phase separation wherein a dense liquid-lignin phase and a lignin-depleted phase are formed. Black liquor, leaving the soap separator in a pulp and paper plant or wood pulp mill, is introduced through line 1 to pre-carbonation column A, typically under pressure between about 50 psig and about 200 psig, preferably about 100 psig, preferably 60 psig. The black liquor has a solids content of between 10% and 70%, but typically a solids content between about 30% to 45%, and has a temperature of about 80° C. to about 120° C.

Figure 2:
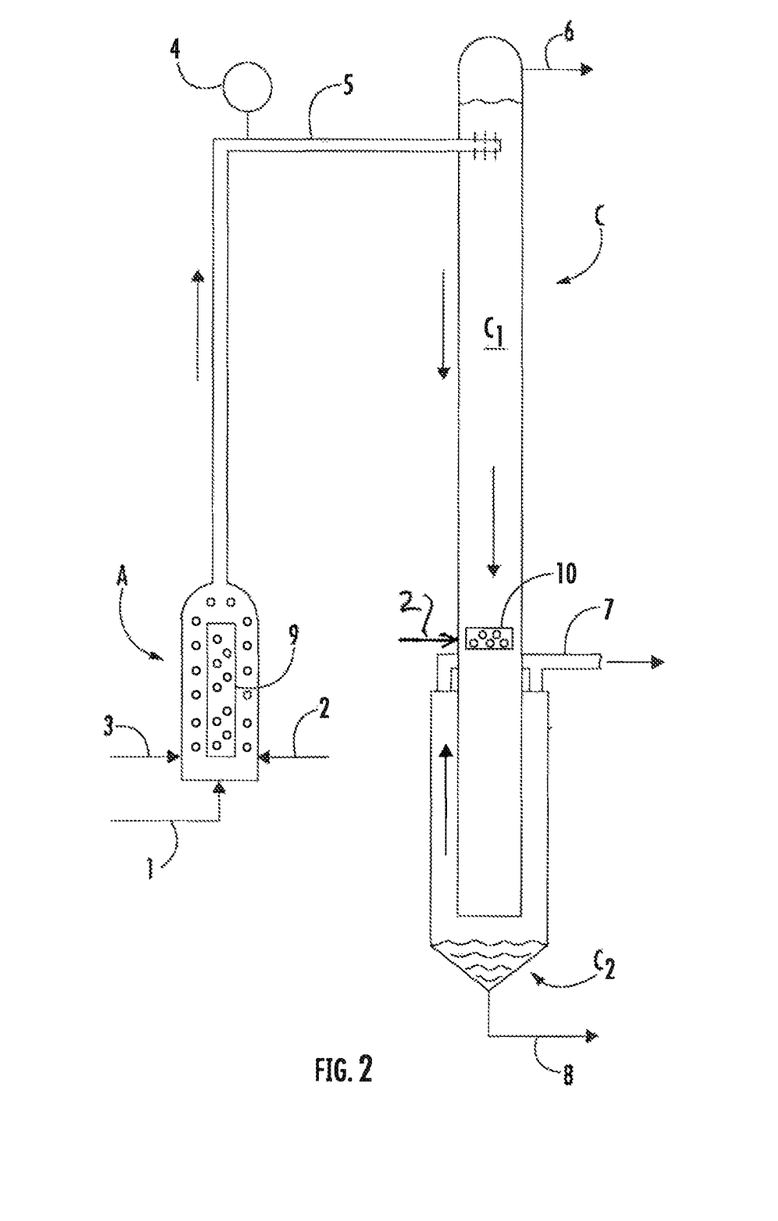
FIG. 2 is an enlarged schematic flow diagram illustrating the pre-carbonation column of the present invention connected to a carbonation column.

As shown in FIG. 1 and FIG. 2, the pre-carbonation column A has two inlet gas streams near the bottom of the column, one (inlet 2) for carbon dioxide, preferably pure $CO_2$, and the other (inlet 3) for recycled vent-gas from the acidification reactor D. In the pre-carbonation column A, the pH of the black liquor is reduced from 14 to between about 11.5 and 12.5 which is before the major fraction of liquid-lignin starts precipitating. The reaction of NaOH and NaSH with $CO_2$ causes a substantial exotherm, increasing the temperature of the stream depending on the NaOH and NaSH content and the solids level of the stream. A pH probe 4, placed at the top of the pre-carbonation column A just before the partially carbonated black liquor enters the carbonation column C, allows the operator to control this pH by adjusting the flow of the $CO_2$.

Since there is minimal or no liquid-lignin droplets formed in the pre-carbonation column A, agitation from high gas flow through the sparger orifices 9, shown more clearly in FIG. 2, facilitate contact of the acidic gases with the incoming black liquor 1. A larger-diameter pipe can enclose the sparger. From the sparger a small diameter pipe rises vertically to the top of the pre-carbonation column A. This assures that any liquid-lignin droplets that may form will be carried by the partially carbonated black liquor into the carbonation column C and not accumulate in the pre-carbonation column A. This reaction causes the release of a substantial exotherm, increasing the temperature of the stream depending on the NaOH content and the solids level of the stream. Malodorous gases including the dangerous gas $H_2S$ leave the top of column $C_1$ via line 6 and are vented to the vent gas absorber F.

Figure 3:
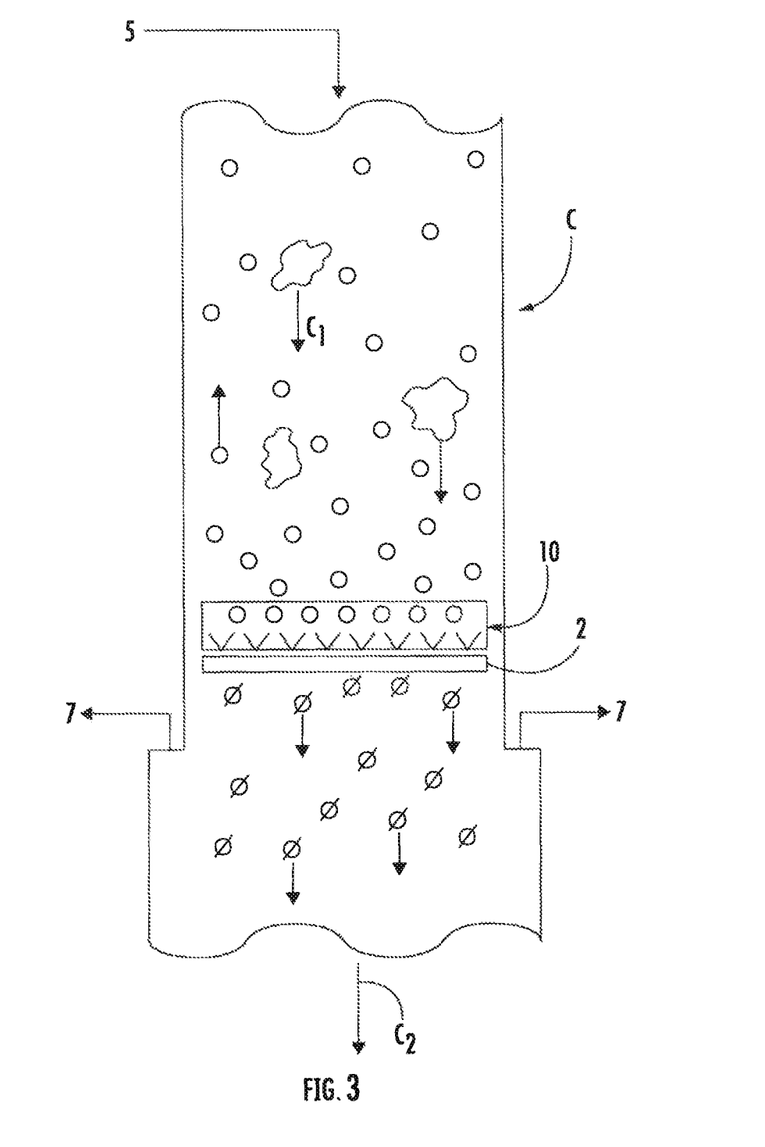
FIG. 3 illustrates an enlarged portion of the carbonation column of the present invention showing a sparger near the bottom of the column above the carbonation settler.

Partially carbonated black liquor from the pre-carbonation column A is introduced via line 5 into the top of the carbonation column C. The size of the carbonation column C will depend upon the volume of black liquor to be treated. For example, in a column designed to process 50,000 tons of lignin per year, the upper portion of the column $C_1$ may be approximately 6 feet in diameter and 40 feet tall. The carbonation column C is constructed of a metal that will not be corroded by the carbonated black liquor at elevated temperature (100° C.-150° C.). One such preferred metal is grade 316 stainless steel. The pre-carbonated black liquor has a pH of between 11.5 and 12.5. The upper portion of carbonation column C, column $C_1$, operates at a nominal pressure of 50 psig to 150 psig, preferably about 80 psig to 100 psig, preferably about 60 psig to 80 psig, and a temperature between about 80° C. and 200° C., preferably about 100° C. to 140° C. Carbon dioxide is introduced into column $C_1$ through line 2 and passes through the orifices of sparger 10. As the $CO_2$ rises and contacts the pre-carbonated black liquor, the carbon dioxide converts much of the sodium (and other metals) ions associated with phenolic groups on the lignin molecules to the hydrogen form, causing the lignin to become insoluble. Globules of liquid-lignin are formed, as shown in FIG. 3. In column $C_1$, the basic components are neutralized, lowering the pH to less than pH 11, preferably a pH of 9 to 10.

Figure 4:
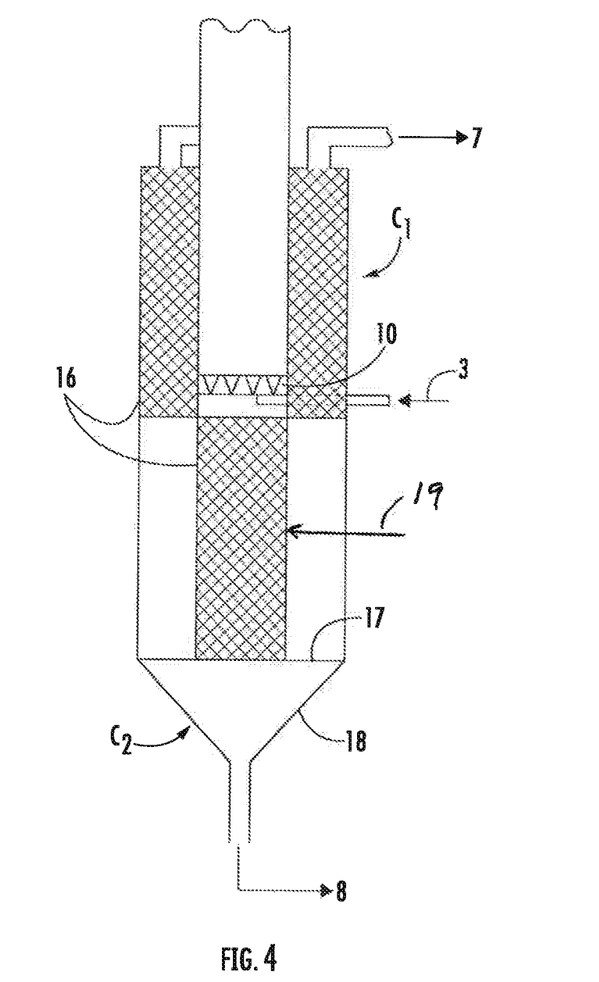
FIG. 4 is an enlarged view of the carbonation column and settler illustrating the structured packing within the carbonation column.

The carbonated black liquor and liquid-lignin as two separate phases pass the sparger 10 into the carbonation settler $C_2$ where the liquid-lignin globules undergo further agglomeration, forming a bulk dense liquid-lignin phase. The carbonation settler $C_2$ is larger in diameter than the carbonation column $C_1$. For example, the carbonation settler $C_2$ may be approximately 10 feet in diameter and 15 feet tall for a 50,000 ton per year column. The carbonation portion of carbonation column C ($C_1$) extends into the carbonation settler $C_2$ as shown in FIG. 4. The carbonated black liquor separates into the light (top) phase which rises through the annulus between the extension of the column 19 and the inner wall of the carbonation settler $C_2$ and is returned to the recovery operation of the host paper or pulp mill via line 7. The dense liquid-lignin phase leaves the bottom of the carbonation settler $C_2$ via line 8.

It is preferred that the carbon dioxide velocity of about 0.6 m/s exiting the sparger 10 in carbonation column $C_1$ forms an acceptable bulk liquid-lignin phase in the carbonation settler $C_2$, as can be seen in FIG. 3. Velocities 3.0 m/s or faster form stable emulsions. Carbon dioxide velocities exiting the orifices of sparger 10 in the carbonation column C are preferably no higher than 0.6 m/s. In pre-carbonation column A, $CO_2$ (from line 2) and/or recycled vent-gas (from line 3) velocities have no such limit in that sparger 9 since there are minimal or no liquid-lignin droplets formed in the pre-carbonation column A.

Increasing the downflow velocity allows a smaller diameter carbonation column $C_1$, thereby decreasing the capital expenditures for the carbonation column C. However, smaller diameter columns also create more turbulence as the countercurrent streams of black liquor and liquid-lignin droplets are falling and $CO_2$ bubbles are rising. Also, a smaller diameter column $C_1$ creates a pinch-point for the liquid-lignin droplets passing the turbulent zone around the carbonation column sparger 10. Decreasing the height of the carbonation column C decreases the capital expenditures. However, unlike the reaction of $CO_2$ in the pre-carbonation column A with the pH 14 black liquor, which is extremely fast, the reaction of $CO_2$ in the carbonation column $C_1$ with incoming pre-carbonated black liquor at pH 12 is much slower. In the carbonation column $C_1$, the reaction occurs during the rise of $CO_2$ bubbles or at the interface at the top of the carbonation column $C_1$. The carbonation column $C_1$ can be as high as economically feasible since higher columns facilitate the reaction and formation of liquid-lignin droplets.

Coalescing droplets into the bulk liquid-lignin phase, an important aspect of this invention, can be enhanced by placing the exit of the carbonation column $C_1$ at or slightly beneath the carbonated black liquor/liquid-lignin interface 17 as shown in FIG. 4. Even very small droplets will coalesce into the bulk liquid-phase if they impinge the interface. The downward velocity of carbonated black liquor exiting the carbonation column $C_1$, ideally about 20 cm/min, is so low that the liquid-lignin phase is not significantly perturbed, and the carbonated black liquor easily rises in the annulus and exits the carbonation settler $C_2$ though line 7 on its return to the mill. At this point, more of the liquid-lignin droplets coalesce into globules as the liquid phase enters the quiet zone underneath the $CO_2$ sparger, and these globules easily fall onto the bulk liquid-lignin surface. The small droplets and globules are assimilated into the bulk liquid-lignin phase preferably, rather than making the 180° turn to rise through the annulus with the lignin-depleted carbonated black liquor.

The yield of liquid-lignin as the dense phase and the resulting yield of product solid lignin is improved when structured packing 16, such as Koch Flexipac®, is placed in the carbonation column $C_1$ below the $CO_2$ sparger 10 as shown in FIG. 4. While structured packing is preferred, dumped packing is an alternative together with a heavy-duty screen at the bottom to retain the packing. The structured packing 16 serves to impede the turbulence in the carbonation column $C_1$ created by the sparger and rising $CO_2$ bubbles from entering the quiet settling zone within the carbonation settler $C_2$. The packing also provides surface onto which liquid-lignin droplets impinge and coalesce into a liquid-lignin film that drips into the bulk liquid-lignin accumulated in the bottom of the carbonation settler $C_2$. The metal of the packing must allow liquid-lignin droplets to "wet" and spread forming a bulk liquid-lignin film. As shown in FIG. 4, a structured packing element also is placed in the upper section of the annulus of the carbonation settler $C_2$ and provides "one last chance" to capture liquid-lignin droplets before leaving the process in the lignin-depleted carbonated black liquor stream returned to the host mill to be burned.

As shown in FIG. 4, to properly position the carbonated black liquor/liquid-lignin interface 17, the operator must be able to "see" the interface using an instrument such as a viscosity probe, which is effective for this purpose, since the viscosity of the bulk liquid-lignin phase accumulating in the lower portion of the carbonation settler $C_2$ is significantly greater than the viscosity of the upper carbonated black liquor phase. Dynatrol® viscosity probes may be used for this purpose. For commercial scale plants three probes are recommended: one level with the bottom exit of the carbonation column, one about 5 cm above the exit and the other about 5 cm below. This allows the operator—or an automated control scheme—to adjust the liquid-lignin flow to the acidification reactor D to keep the interface properly placed near the exit of carbonation column $C_1$.

An attractive attribute of the improvements described herein is that the lignin process described in the '464 patent and others, can be placed "on idle" for extended periods of time, keeping the system at operating temperature so the restart is much faster than a cold start. The liquid-lignin phase should not be left stagnant in the bottom of the carbonation settler where it could solidify in localized cold spots on metal surfaces. Thus, a pump-around loop is provided so when the system is placed on idle the loop is activated so the liquid-lignin phase is constantly moving.

The more time the liquid-lignin phase is retained at the higher temperature within the carbonation settler $C_2$, the higher the molecular weight of the resulting lignin following treatment in the acidification reactor D. Time at elevated temperature at pH 9-10 increases molecular weight of the resulting lignin. The longer the residence time in the carbonation settler; the higher the molecular weight of the lignin.

As shown in FIG. 4, steep angles of the cone 18 at the bottom of the carbonation settler $C_2$ facilitate the viscous liquid-lignin flowing downward to exit the carbonation settler. These steep angles inhibit "dead zones" where the liquid-lignin phase can reside for extended periods of time, causing a high molecular weight "tail" in the distribution. It has been found that a 30° angle of the cone in the bottom of the carbonation settler $C_2$ is sufficient to: (a) provide sufficient slope so that the liquid-lignin phase flows to the center of the outlet port; and (b) inhibit "funneling" of the carbonated black liquor into the center of the cone so that carbonated black liquor leaves the bottom of the carbonation settler in two-phase flow with the liquid-lignin as shown in FIG. 4. A 30°-45° slope for the cone 18 and having the exit of the carbonation column level with the top of the cone 18 provides a good trade-off where liquid-lignin flows freely to the center exit port at the bottom of the cone 18 and into line 8, making the residence time more uniform eliminating any high-molecular weight tail in the distribution.

The liquid-lignin is then transferred via line 13 to acidification reactor D where the liquid-lignin phase is contacted with an acid (line 16), such as acetic or sulfuric acid, to completely replace the sodium (and other metal) ions associated with the phenoxy- and carboxy-groups on the lignin molecule with hydrogen ions. At the preferred temperature and pressure of the acidification reactor D, the liquid-lignin is converted to solid lignin particles. Without this step, the ash levels of the lignin will be very high. Instead of desirable ash levels less than 2%, the ash levels will be between 10-20%. During this acidification step the pH is reduced to a pH less than 4, preferably from about 1.5 to about 3.5. The acidification step is carried out at a temperature up to about 120° C., preferably in the range of 80° C. to 100° C. The gases from the reaction are vented through line 14. The acidified lignin from line 15 is then filtered and washed creating a low-ash lignin.

There are two other options for transferring the liquid-lignin from the carbonation settler $C_2$ to the acidification reactor D coupled with recycling the vent gas (see line 3) from the acidification reactor D to the pre-carbonation column A. These two options are shown in FIG. 5.

Figure 5:
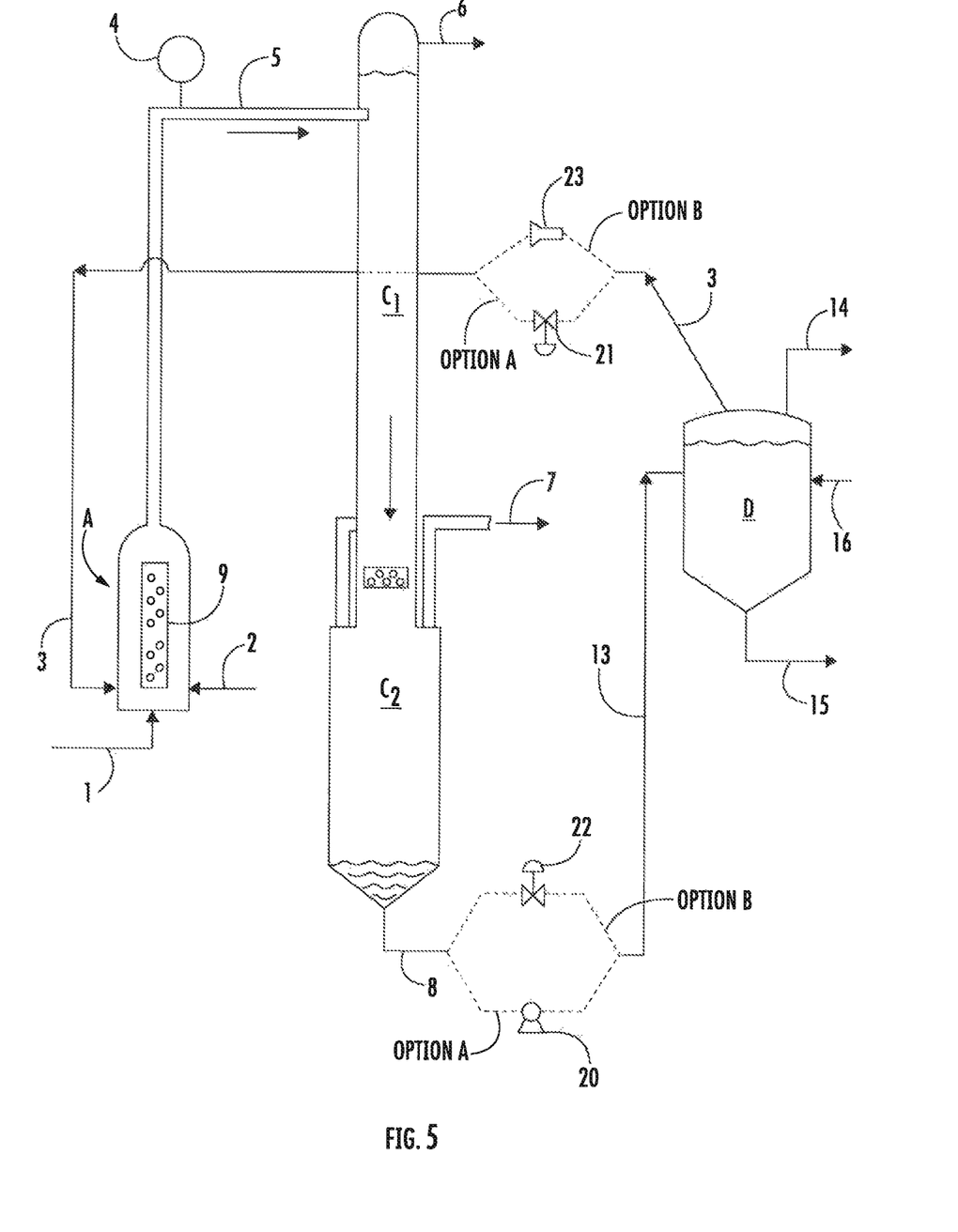
FIG. 5 is a schematic diagram which illustrates two options for controlling the liquid-lignin level in a carbonation settler and recycling vent-gas from the acidification reactor.

In the first option shown as "option A" in FIG. 5, the liquid-lignin is pumped through pump 20 via line 8 from the carbonation settler $C_2$ to the acidification reactor D and a control valve 21 is used for gas recycle. Operating the carbonation settler at a lower pressure than the acidification reactor, and pumping the liquid-lignin from the carbonation settler to the acidification reactor operating at a higher pressure allows recycling the vent gas 3 from the acidification reactor D to the pre-carbonation column A through control valve 21. The advantages of option A are: (a) recycle of the acidic vent gas from the acidification reactor is simple, letting down the pressure through a control valve; and (b) the pump-around loop for the liquid-lignin within carbonation settler $C_2$ simplifies the start-up and idling of the carbonation column and carbonation settler.

When using "option B" the carbonation column C is operated at high pressure, pushing liquid-lignin into the acidification reactor D under pressure using a control valve 22 to maintain the target flow rate of liquid-lignin. This is coupled with a gas-jet compressor 23. The distinctive feature of option B uses a gas-jet compressor powered by $CO_2$ as the motive gas to push the acidic vent gas from the acidification reactor D via line 3 into the pre-carbonation column A as shown in FIG. 5. The motive gas $CO_2$ replaces or supplements the $CO_2$ used to reduce the black liquor pH from 14 to 12 in the pre-carbonation column A. In the absence of air, the acidic vent gas and motive $CO_2$ react continuously, quantitatively, and rapidly with the incoming black liquor. The advantages of option B include: (a) the acidification reactor D can be operated at a low pressure, near atmospheric, reducing the capital expenditure for the reactor; (b) eliminating the pump for liquid-lignin, using a control valve to regulate the flow from the carbonation settler into the acidification reactor D; and (c) the carbonation column C can be operated at a higher pressure that accelerates the reaction of $CO_2$. If the motive gas $CO_2$ is too high causing the pH at the top of the pre-carbonation column A to be so low that excessive liquid-lignin droplets are formed, steam can be used as the motive gas.

Without the possibility of using a pump-around loop for the liquid-lignin, the procedures for start-up and placing the carbonation settler $C_2$ on idle for extended periods of time (several hours or even days) are more difficult. Also, the control valves 21, 22 should be either a ball valve or a v-port valve, so that if the valve starts to plug, the valve can open fully to free itself.

Figure 6:
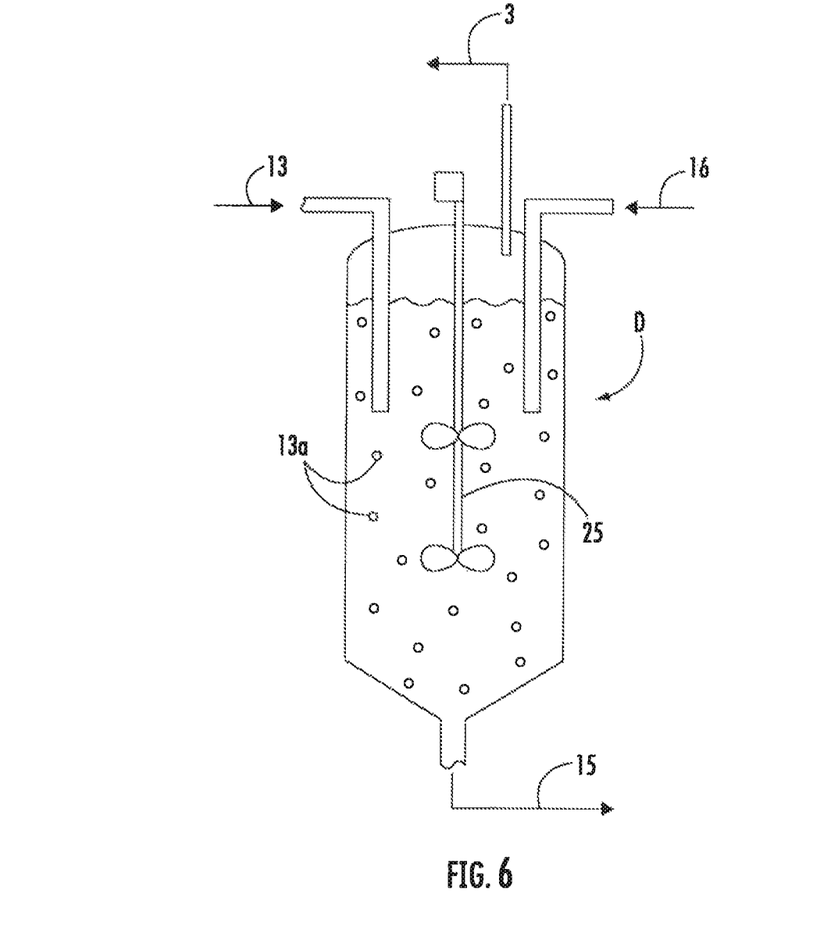
FIG. 6 illustrates the acidification reactor for use in the process of the present invention.

Inside the acidification reactor D shown in FIG. 6, incoming dense liquid-lignin from the carbonation settler $C_2$ introduced to the reactor D through line 13 reacts rapidly with the acidic aqueous phase introduced through line 16 to form irregularly shaped lignin particles 13a, removed through line 15. The liquid-lignin expands rapidly from the evolution of $CO_2$, creating solid, porous, irregularly-shaped lignin particles. This "controlled explosion" of the liquid-lignin enhances the mass transfer and removal of sodium sulfate ($Na_2SO_4$) and other inorganic salts that contributed to the ash content of the final lignin product. The controlled explosion of the liquid-lignin droplets can be explained by the composition of the bulk liquid-lignin phase. Liquid-lignin at pH 9-10 has three major components: lignin ($\approx$50%), inorganic ash ($\approx$20%), and water ($\approx$30%). The water contains dissolved sodium bicarbonate which reacts extremely rapidly with the aqueous sulfuric acid within the acidification reactor as shown in Equation (1):

$$2NaHCO_3 + H_2SO_4 \rightarrow Na_2SO_4 = 2CO_2(gas) + 2H_2O \qquad \text{(Equation 1)}$$

The amount of $CO_2$ emitted by the liquid-lignin droplets is significant. Sodium bicarbonate ($NaHCO_3$) is very soluble in water, about 30 grams per 100 grams of water at 100° C. From stoichiometric calculations, the amount of $CO_2$ evolved from the liquid-lignin is about 0.10 grams $CO_2$ per gram lignin, roughly one-half the total $CO_2$ required by the lignin producing process of the '464 patent (0.20-0.25 grams of $CO_2$ per gram of lignin).

Referring to Equation 1 and FIG. 6, as liquid-lignin droplets enter the acidification reactor D through line 13 underneath the liquid surface near the agitator 25, the $NaHCO_3$ is converted to $CO_2$ gas that is formed rapidly, virtually blowing the liquid-lignin phase apart. The $CO_2$ gas that is formed leaves the reactor through vent gas line 3. Also occurring simultaneously, the sodium cations associated with the lignin phenolic and carboxylic groups in the liquid-lignin at pH 9-10 are replaced by hydrogen ions at pH 2-3. The sodium becomes sodium sulfate ($Na_2SO_4$). Because of the porous nature of the solid particles, $Na_2SO_4$ is easily removed through filtration.

Figure 7:
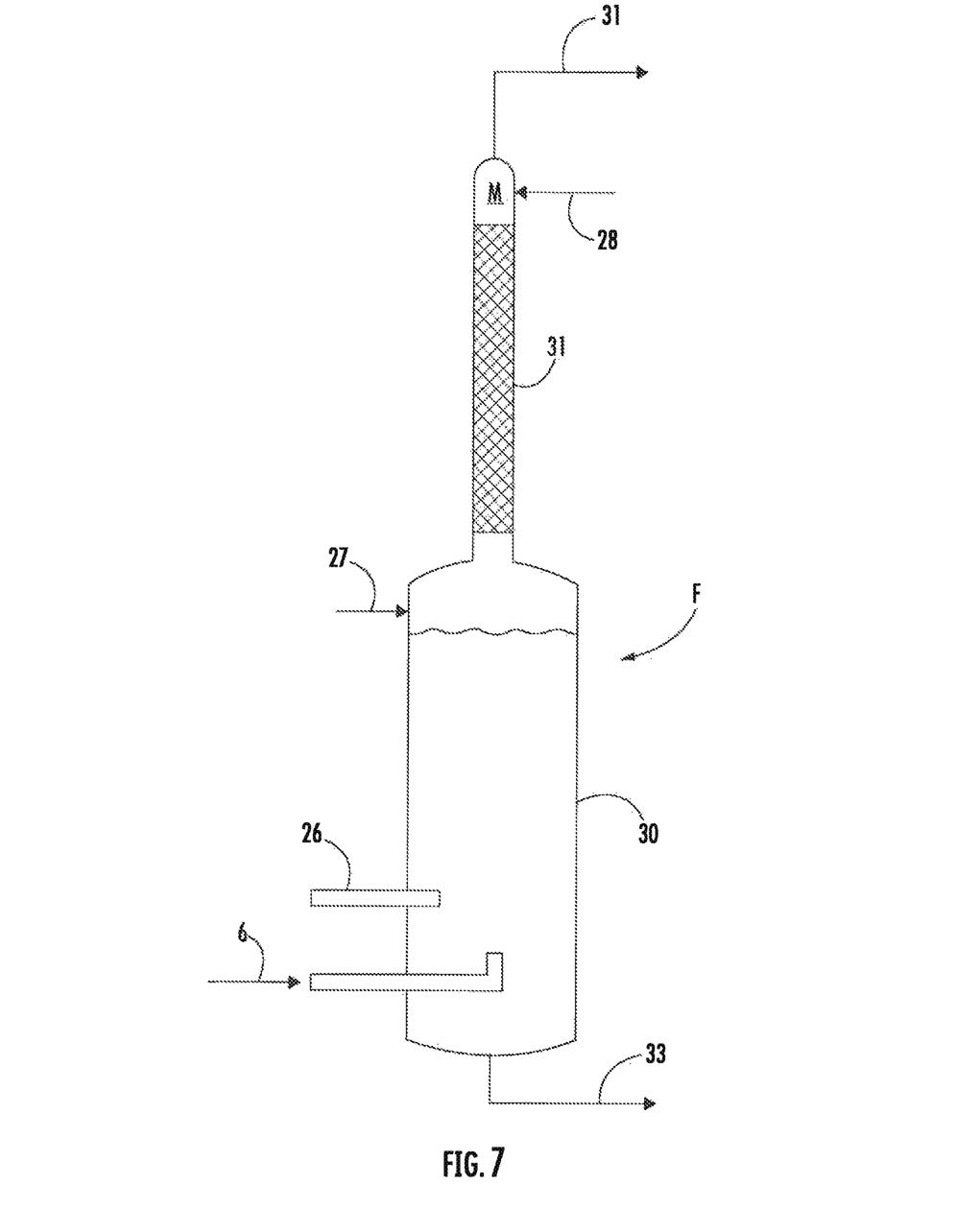
FIG. 7 shows a vent gas absorber for use in the process of the present invention.

To remove the sulfur-containing gases from the system, vent gas absorber F is provided as best shown in FIG. 7 and includes an absorption section 30 and a stripping section 31 that contains packing to improve gas/liquid contact. The vent gas absorber F is located to conveniently receive vent gas from the carbonation column C through line 6 which is near the bottom of absorption section 30 of vent gas absorber F. The other vessels that emit sulfur gases and that do not contain air, notably from the acidification reactor D if not recycled, and vents from other vessels not shown in the figures including the neutralization tank for the carbonated black liquor and the lignin slurry tank. These vessels have their individual vent lines bubbling their off-gasses into the vent gas absorber F as shown through line 26 from the top of the carbonation column C. The air-free acid gases—notably $H_2S$, MeSH and $CO_2$—react extremely rapidly and virtually quantitatively in the NaOH solution contained within section 30.

The vapor space of the absorption section 30 of vent gas absorber F is purged with low air flows through line 27 that is drawn through the vapor spaces of the wash brine and acid brine tanks (not shown in figures). This small air stream also flushes the DMS and DMDS which are not absorbed effectively in section 30 into the stripping section 31 which is irrigated with fresh 10% NaOH solution entering through line 28. The NaOH solution drips from the bottom of section 31 directly into section 30 providing the NaOH needed to absorb the air-free acid gases entering lines 6 and 26 and vent lines from other air-free vessels (not shown in figures). The small flow of purged air exits the top of the packed column 31 and vents into the host mill system or the atmosphere since the sulfurous gas composition is so low. The NaOH, NaSH and $Na_2CO_3$ salts in solution are removed from the bottom of the absorption section 30 through line 33.

The spent scrubbing fluid contains significant quantity of NaSH formed by Reaction 2:

$$H_2S(gas) + NaOH \rightarrow NaSH + H_2O \qquad \text{(Reaction 2)}$$

NaSH is an expensive pulping catalyst, so the vent gas absorber creates valuable NaSH in-situ. However, there will also be carbonate salts formed from the excess $CO_2$ in the vent from the carbonation column $C_1$. Because of the presence of these carbonate salts, the host mill may choose not to use "free" NaSH. Instead, the "spent" sodium hydroxide leaving line 33 may be combined with the carbonated black liquor, serving the purpose of neutralizing that stream before being returned to the host mill.

Many modifications and other embodiments of the inventions set forth herein will come to mind to one skilled in the art to which the inventions pertain having the benefit of the teachings present in the foregoing descriptions. Therefore, it is to be understood that the inventions are not to be limited to the specific embodiments disclosed and that modifications and other embodiments are intended to be included within the scope of the invention. Although specific terms are employed herein, they are used in a generic and descriptive sense only and not for purposes of limitation.

What is claimed is:

1. A process for recovering purified, solid lignin from black liquor comprising:
   (a) in a pre-carbonation column, pre-carbonating said black liquor in a first carbonation step with $CO_2$ to reduce a pH to between about 11.5 and about 12.5 to form a partially carbonated black liquor;
   (b) transferring an entire volume of said pre-carbonation column to a carbonation column;
   (c) in said carbonation column, further carbonating said partially carbonated black liquor in a second carbonation step with $CO_2$ sufficient to reduce the pH to between about 9.0 and about 10.5 to form carbonated black liquor;
   (d) subjecting said carbonated black liquor to a phase separation in a carbonation settler, wherein a dense liquid-lignin phase and a light lignin-depleted liquid phase are formed;
   (e) transferring said dense liquid-lignin phase from said carbonation settler to an acidification reactor;
   (e) in said acidification reactor, neutralizing basic components from said dense liquid-lignin phase with sufficient acid to reduce said pH to below 4 and evolve gaseous $CO_2$, thereby generating a porous, solid lignin; and
   (f) washing said porous, solid lignin to remove residual acid and ash content.

2. The process according to claim 1 wherein said black liquor is at a 10% to 70% solids content when entering said first carbonation step in said pre-carbonation column.

3. The process according to claim 1 wherein said second carbonation step is carried out at a temperature between about 80° C. and 200° C. and a pressure between about 50 psig and about 200 psig in said carbonation column.

4. The process according to claim 1 wherein said second carbonation step is carried out by contacting said pre-carbonated black liquor with $CO_2$ counter-currently.

5. The process according to claim 1 wherein said dense liquid-lignin phase is treated with sulfuric acid in said acidification reactor.

6. The process according to claim 1 wherein an aqueous fraction of said dense liquid-lignin phase exiting from said carbonation column is about 15% to about 35%.

7. The process according to claim 1 wherein said pre-carbonation column includes a sparger to facilitate contact of said $CO_2$ with said black liquor.

8. The process according to claim 1 wherein said carbonation column includes a sparger to facilitate contact of acidic gases with said partially carbonated black liquor.

9. The process according to claim 8 wherein said $CO_2$ exits said sparger at a velocity of up to 0.6 m/s.

10. The process according to claim 1 wherein vent gas from acidification of said dense liquid-lignin phase in said acidification reactor is recycled to said pre-carbonation column.

11. The process according to claim 1 wherein structural packing is positioned in said carbonation column such that said carbonated black liquor passes there through and serves to impede turbulence and improve liquid-lignin agglomeration in said carbonation settler.

12. The process according to claim 11 wherein said carbonation settler is operated at a pressure lower than a pressure of said carbonation column used in said second carbonation step.

13. The process according to claim 11 wherein said carbonation settler has a carbonation settler cone having slope angle of 30°-45°.

14. The process according to claim 11 wherein at least a portion of said structural packing is positioned proximate an interface of said dense liquid-lignin phase and said light lignin-depleted liquid phase in said carbonation settler.

15. The process according to claim 1 wherein said pH of said dense liquid-lignin phase is reduced to between about 1.5 and about 3.5 in said acidification reactor.

16. The process according to claim 1 wherein:
    said carbonation settler is operated at a first pressure;
    said acidification reactor is operated at a second pressure;
    said second pressure is greater than said first pressure;
    said dense liquid-lignin phase is transferred from said carbonation settler to said acidification reactor using a pump; and
    vent gases are transferred from said acidification reactor to said pre-carbonation column using a control valve for recycling of said vent gases.

17. The process according to claim 1 wherein:
    said carbonation settler is operated at a first pressure;
    said acidification reactor is operated at a second pressure;
    said second pressure is less than said first pressure;
    said dense liquid-lignin phase is transferred from said carbonation settler to said acidification reactor using a control valve; and
    vent gases are transferred from said acidification reactor to said pre-carbonation column using a $CO_2$ motivated gas-injector for recycling of said vent gases.

18. The process according to claim 1 wherein sulfur-containing air-free vent gases are treated with a caustic solution that absorbs acidic sulfurous vent gases.

19. A method for producing a lignin product from black liquor, said method comprising:
    in a first carbonation step, carbonating said black liquor with $CO_2$ to reduce a pH of said black liquor and form a partially carbonated black liquor;
    transferring an entire volume of said partially carbonated black liquor to a second carbonation step;
    in said second carbonation step, carbonating said partially carbonated black liquor with $CO_2$ to reduce a pH of said partially carbonated black liquor and form a carbonated black liquor;
    phase separating said carbonated black liquor into a dense liquid-lignin phase and a light lignin-depleted liquid phase;
    acidifying said dense liquid-lignin phase to neutralize basic components from said dense liquid-lignin phase and evolve gaseous $CO_2$;

generating a porous, solid lignin in response to evolving said gaseous $CO_2$ during acidifying; and washing said porous, solid lignin to remove ash.

20. The method of claim 19, wherein:

in said first carbonation step, said pH of the black liquor is reduced to between about 11.5 and about 12.5 to form said partially carbonated black liquor;

in said second carbonation step, said pH of said partially carbonated black liquor is reduced to between about 9.0 and about 10.5 to form said carbonated black liquor; and acidifying said dense liquid-lignin phase reduces a pH of said dense liquid-lignin phase to below about 4.0.

* * * * *